(No Model.)
G. W. GIFFARD.
SNAP HOOK.
No. 319,972. Patented June 16, 1885.
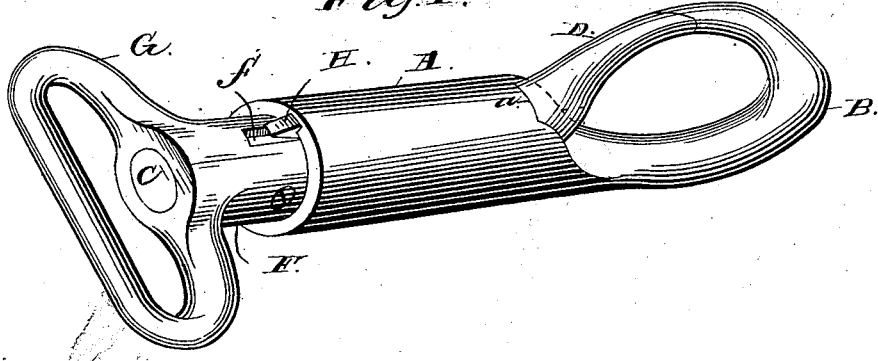
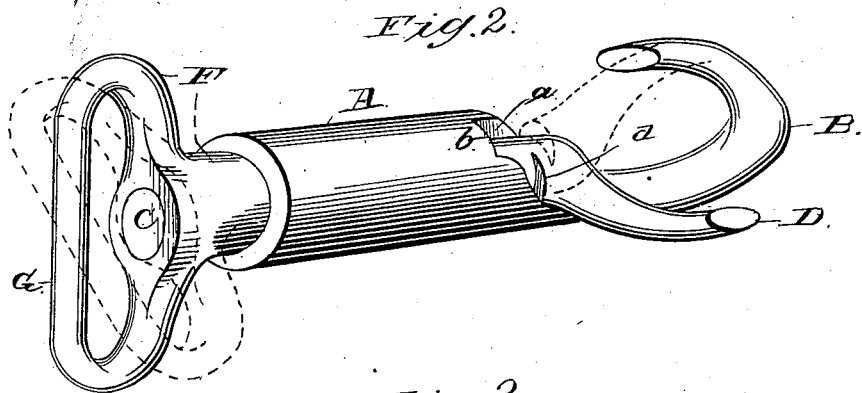
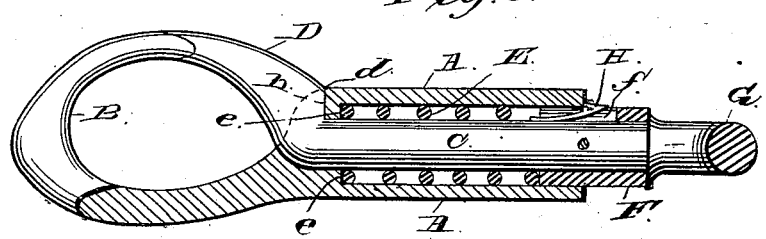
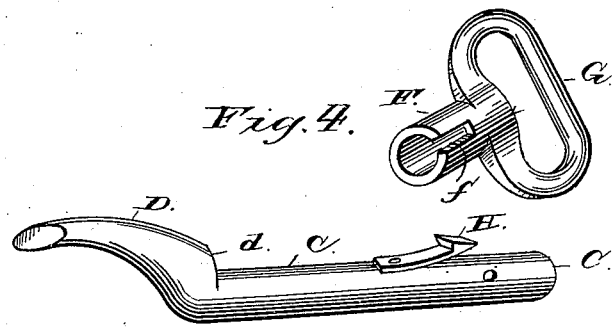
WITNESSES
M. E. Fowler
Edward G. Siggers
G. W. Giffard
INVENTOR
by C. A. Snow & Co.
Attorneys

UNITED STATES PATENT OFFICE.

GEORGE WASHINGTON GIFFARD, OF GREAT BEND, KANSAS, ASSIGNOR OF TWO-THIRDS TO OLIVER B. WILSON AND MOSES BROS., OF SAME PLACE.

SNAP-HOOK.

SPECIFICATION forming part of Letters Patent No. 319,972, dated June 16, 1885.

Application filed January 21, 1885. (No model.)

*To all whom it may concern:*

Be it known that I, GEORGE W. GIFFARD, a citizen of the United States, residing at Great Bend, in the county of Barton and State of Kansas, having invented a new and useful Improvement in Snap-Hooks, of which the following is a specification, reference being had to the accompanying drawings.

This invention relates to snap-hooks, and is specially designed as an improvement on the device shown and described in the application for Letters Patent, Serial No. 145,990, filed by me October 20, 1884, and allowed December 15, 1884. In this application is shown a snap-hook consisting of a hollow cylindrical body carrying an integral hook at its forward end and a spring-pressed sliding stem working within the body and having a pivoted hook at its front end, whereby the pressing or sliding of the stem inward through the body causes the pivoted hook to spring outward to uncover the opening or entrance to the integral hook and allow the attachment of the device to any part of the harness, (should it be used in that connection,) but as soon as pressure is relieved from the stem the spring exerts its inherent force and causes the withdrawal of the parts to their normal positions. In practice I have found that this construction possesses disadvantages in many respects, inasmuch as the attachment of the pivoted hook is insecure and liable to work out of order; besides, the attachment or application of the device is very inconvenient, since the pivoted hook projects outward, and is in the way. Furthermore, the device cannot be manufactured and sold at a desirable price by the arrangement of the parts shown. It is to avoid these and other objections experienced in the practical working of my snap-hook that I have devised the present improvements, by means of which I simplify the construction by dispensing with the pivoted hook on the sliding stem by providing an integral hook on the latter, said hook being on a different plane from the projecting hook of the body, the two hooks meeting together when in their normal positions, whereby the pressing or sliding of the stem inward causes the hook on the stem to clear the hook on the body, and then by giving the stem a quarter-turn to one side its hook is turned to a corresponding degree to provide a sufficient opening or entrance for the attachment or application of the device to the desired part. An additional improvement is to provide a spring-catch on the sliding stem to hold the hook in its locked position, until, by the withdrawal of the catch from engagement, the stem may be slid inward and turned in the manner stated.

With these ends in view the said invention consists in certain details of construction and combination of parts, as hereinafter set forth, and particularly pointed out in the claims.

In the accompanying drawings, Figure 1 is a perspective view of my improved snap-hook in its normal position. Fig. 2 is a similar view showing the stem slid inward and turned to one side when attaching it in position. Fig. 3 is a longitudinal section of Fig. 1. Fig. 4 is a detail perspective view of the sliding stem and the handle-loop detached.

Like letters are used to designate corresponding parts in the several figures.

Referring to the drawings, A designates the hollow cylindrical body, bored longitudinally from end to end, the front end of which body is provided with an integral curved hook, B, substantially in the form of the letter C, the end of said hook being cut off diagonally, as shown.

C designates the sliding stem, (see Fig. 4,) substantially cylindrical in form, working within the body A, and having its front end enlarged and provided with an integral hook, D, having its front end also cut off diagonally to fit neatly against the end of the hook B, the said hook D in its normal position occupying the space between the body and the end of the hook B, so as to close the opening or entrance to the hook. The front end of the body A is cut out at *a*, to provide a wall, *b*, and the base of the hook D is correspondingly cut off at *d*, to abut against the wall *b* and limit the backward movement of the stem.

E designates a coiled spring encircling the stem within the body, and having one end bearing against an annular shoulder, *e*, provided on the interior of the body, and its other end against the front end of a coupling sleeve or collar, F, projecting from the handle-loop G. This sleeve or collar incloses the lower end of the stem, and is secured thereto by screws or any other suitable fastening means, and in operation works within the rear open end of the body. The loop G enables the snap-hook to be attached to the strap or other part of the harness, (when used in this connection,) and also performs the function of a handle by which the device is operated. It will be observed that the tension of the spring forces the stem in a rearward direction to keep the hook normally closed, the wall $d$ of the hook D abutting against the wall $b$ at the cut-out front portion, $a$, of the body, and limiting the movement of the stem, and thus preventing its hook D from being withdrawn from the hook B by the action of the spring.

H designates a spring-catch secured to the stem C and projecting rearwardly, the end of the catch working in a recess or notch, $f$, of the sleeve or collar F, and adapted to catch around the outer wall of the rear end of the body to hold the stem from working forward, and thus retain the hook in its locked position. When it is desired to operate the hook, the catch is depressed in its recess $f$, so as to be withdrawn from engagement with the body, when the stem may be slid forward to open the hook in the manner hereinbefore stated.

It will be observed that the hook B on the body is not arranged on a direct line with the body, but slightly to one side, while the hook D on the stem is extended or arranged slightly on one side of the direct line with the stem, and since the two hooks are so disposed when the stem is operated, instead of the hook D striking the hook B, as would be the case if they were arranged on straight lines, said hook D will clear the other, and thus enable the device to work practically in every respect.

The operation of my invention will be readily understood from the foregoing description, taken in connection with the annexed drawings.

In its normal position the snap-hook is retained in the locked position by the spring-catch H. By pressing the latter inward it is withdrawn from engagement to permit the sliding of the stem through the body, which causes the hook D to work forward alongside of the hook B for a short distance, when, by giving the handle-loop G a quarter-turn, the stem is revolved or rotated a corresponding degree, and its hook D turned laterally outward at an angle to the hook B to uncover the opening or entrance to the hook and allow the device to be applied to the part desired. When this has been done, pressure on the stem is relieved, the spring E exerting its force and returning the parts automatically to their former positions, the spring-catch H catching automatically around the rear end of the body and holding the parts locked.

It will be seen that I thus provide a simple and convenient article for the purposes intended, which will be proof against accidental unlocking, which is easily applied in position, can be manufactured at a small price, and possesses other advantages of minor consideration.

Having described my invention, I claim—

1. In a snap-hook, the combination, with the body carrying a hook, of the sliding stem carrying a hook, and a spring-catch provided on said stem to catch around the body and hold the parts in the locked position, as set forth.

2. In a snap-hook, the combination, with the body carrying a hook, of the sliding stem, also carrying a hook, a loop attached to the rear end of the stem, a coiled spring, and a spring-catch carried by the stem, arranged to be pressed inward to withdraw it from engagement and automatically catch around the body to hold the parts in their normal positions, as set forth.

3. In a snap-hook, the combination, with the body carrying a hook, of the sliding stem, also carrying a hook, a coiled spring encircling the stem and arranged within the body, an opening, $a$, cut out of the front end of the said body to provide an abutting wall, and a similar abutting wall, $d$, provided on the stem at the base of the hook to limit the rearward movement of the hook, as set forth.

4. In a snap-hook, the combination, with the hollow body carrying a hook having its end beveled, of the sliding stem, also carrying a hook, D, which has its front end correspondingly beveled and working within the body, the latter hook D being bent or extended laterally to one side of the other hook, and a handle or loop attached to the end of the stem, whereby the pressing or sliding of the stem inward or forward causes its hook to clear the hook on the body, when by giving a quarter-turn to the stem its hook is thrown laterally outward at an angle to the hook on the body, as and for the purpose set forth.

In testimony that I claim the foregoing as my own I have hereto affixed my signature in presence of two witnesses.

GEORGE WASHINGTON GIFFARD.

Witnesses:
 A. J. BUCKLAND,
 B. H. HOAG.